United States Patent Office 3,549,669
Patented Dec. 22, 1970

3,549,669
PROCESS FOR PREPARING POLYALKYL-
p-BENZOQUINONE
Milton Lewis Clemens, Jr., Kingsport, Tenn., assignor to
Eastman Kodak Company, Rochester, N.Y., a corporation of New Jersey
No Drawing. Filed Dec. 14, 1967, Ser. No. 690,406
Int. Cl. C07c 49/64
U.S. Cl. 260—396                                 5 Claims

ABSTRACT OF THE DISCLOSURE

Polyalkyl-p-benzoquinone is prepared by direct oxidation of the corresponding polyalkyl phenol with dilute, aqueous nitric acid in a solvent medium.

---

This invention relates to a process for preparing polyalkyl-p-benzoquinone from polyalkyl phenol. More particularly, the invention concerns the preparation of polyalkyl p-benzoquinone by direct oxidation of the corresponding polyalkyl phenol with dilute, aqueous nitric acid in a solvent medium.

It has been reported that 2,3,5-trimethylphenol is not oxidizable to the quinone by the use of sulfuric acid in aqueous sodium dichromate solution or by other methods of direct oxidation. The prior art has also stated that 2,5-dimethylphenol may be oxidized to the quinone by employing an acetic-sulfuric acid solution with 80 percent hydrogen peroxide. Such a procedure, however, presents considerable hazard in commercial application and is generally unsuitable for use in a commercial operation. In addition, it has been reported in Reactions of Organic Compounds by W. J. Hickinbottom, Longmans, Green and Co., at page 94 that phenols are converted to the corresponding nitro compound by the action of dilute nitric acid, more concentrated nitric acid resulting in the formation of the corresponding di- and tri-nitro derivatives. Surprisingly, however, I have found that a polyalkyl phenol in a solvent medium is converted to the corresponding polyalkyl p-benzoquinone by the action of dilute nitric acid.

Accordingly, it is an object of the present invention to provide a novel commercial process for oxidatively converting polyalkyl phenol to polyalkyl-p-benzoquinone of high quality and good yield. It is a further object of the invention to provide a simple, practical and economical process for preparing polyalkyl-p-benzoquinone.

These and other objects, features and adventures of the present invention will become apparent from a consideration of the following detailed description.

The process of the present invention is generally carried out in continuous or batchwise operation by oxidizing a polyalkyl phenol with nitric acid in the presence of a solvent solution. The chemical reaction which takes place during the process of the invention may be represented by the following equation:

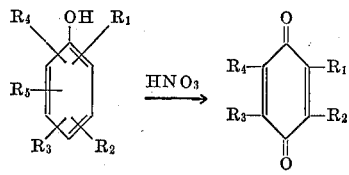

wherein $R^1$, $R^2$, $R^3$, $R^4$, and $R^5$ may be the same or different alkyl groups or hydrogen and at least two of the R groups are the same or different alkyl groups. The process is preferably accomplished by first dissolving the polyalkyl phenol in a suitable solvent such as acetic acid. A solution of nitric acid is then added to the solvent mixture in an amount sufficient to produce substantially complete oxidation of the phenol. The product is then removed from the reaction mass by a product isolation method such as steam distillation followed by ethyl ether extraction or direct extraction with toluene followed by distillation.

The temperature maintained during the reaction may vary from about 5° C. to about 80° C., with temperatures from about 20° C. to about 30° C. being preferred. The nitric acid solution employed may vary from relatively concentrated such as about 71 percent nitric acid to relatively dilute such as about 19 percent nitric ocid. Preferably, however, relatively diulte solutions of 29 percent nitric acid are employed. Nitric acid may be generated in situ by adding a sufficient quantity of ammonium nitrate and sulfuric acid to produce a dilute nitric acid concentration. Preferably, however, superior results are achieved when nitric acid, per se, is added to the solution of phenol and solvent in dilute quantities. Several solvents for the phenol such as water, heptane, acetic acid and aliphatic hydrocarbons have proven useful during the process but glacial acetic acid is the preferred solvent for the reaction.

Sodium nitrite is preferably added to the mixture of phenol and solvent in order to initiate reaction when the nitric acid solution is added to the solvent mixture. Even though sodium nitrite is not required for the reaction, without its presence a short induction period transpires after addition of the nitric acid solution before evidence of reaction occurs in the form of a temperature increase and nitrogen oxides evolution.

By the precess of this invention polyalkyl phenols such as 2,3,6-trimethylphenol, 2,4,6-trimethylphenol, 2,6-dimethylphenol, 2,3,6-triethylphenol, 2,6-diethylphenol and the like are converted to the corresponding polyalkyl-p-benzoquinone. Other polyalkyl phenols having substitution by alkyl radicals with up to 8 carbon atoms demonstrate suitable results and yields. Of particular interest is 2,3,4,6-tetramethylphenol which is converted by nitric acid colution to 2,3,6-trimethyl-p-benzoquinone. Particularly superior results have been achieved with the use of polyalkyl phenols having substitution at the 2 and 6 position with or without other substitution at the remaining positions. Consequently, 2,3,6; 2,6; and 2,4,6 alkyl substituted phenols have given superior results and are the preferred starting materials. 2,3,6-trimethylphenol is a particularly preferred starting material since it produces good yields of 2,3,6-trimethyl-p-benzoquinone which is an important intermediate in the synthesis of dl-α-tocopherol, synthetic vitamin E.

When the phenol compound is named as a derivative of phenol, the numbering starts with the position at which the hydroxyl group is substituted, and in that case, the formula is written and numbered as follows:

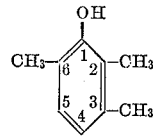

when 2,3,6-trimethylphenol is the reactant.

A more complete understanding of the invention will be obtained from the following examples:

EXAMPLE 1

A charge of 15.0 g. 2,3,6-trimethylphenol (98.5 percent) is dissolved in 30 ml. of glacial acetic acid. With agitation 0.5 g. of sodium nitrite is added. Then a solution of 7.1 ml. conc. nitric acid (70–71 percent) and 14.2 ml. water (to make 29 perecnt nitric acid) is added over 26 minutes at 20–25° C. After stirring 32 minutes at 20–25° C., 100 ml. of water is added and the mixture is steam distilled. The steam distillate is extracted with ethyl ether and the ethyl ether solution is washed with dilute aqueous sodium bicarbonate solution and dried on the steam cone to a temperature of 90° C. to give 10.4 g. of trimethyl-p-benzoquinone which assays 98.9 percent. The assay conversion then is 62.5 percent of the theoretical. The 2,3,6-trimethylphenol-acetic acid ratio employed in this example is 1 part to 2.1 parts.

EXAMPLE 2

A charge of 10.0 g. 2,4,6-trimethylphenol is dissolved in 30 ml. of glacial acetic acid. With agitation 0.5 g. of sodium nitrite is added. Then a solution of 6.5 ml. conc. nitric acid (70–71 percent) and 13.5 ml. water (to make 29 percent nitric acid) is added over 31 minutes at 25–26° C. After stirring 30 minutes at 25–26° C., 100 ml. of water is added and the mixture is steam distilled. The steam distillate is extracted with ethyl ether and the ethyl ether solution is washed with dilute aqueous sodium bicarbonate solution and dried on the steam cone to a temperature of 90° C. to give 3.0 g. of 2,6-dimethyl-p-benzoquinone which assays 91.8 percent. The assay conversion then is 27.6 percent of the theoretical yield.

EXAMPLE 3

A mixture of alkylated phenols containing 14.6 percent 2,4,6-trimethylphenol and 68.7 percent 2,3,6-trimethylphenol when oxidized as in Example 2 gives 56.2 percent conversion of the 2,4,6-trimethylphenol to 2,6-dimethyl-p-benzoquinone and 77.0 percent conversion of the 2,3,6-trimethylphenol to trimethyl-p-benzoquinone. As shown in the above example, blocking the para position does not prevent the production of para-benzoquinone. The para-methyl group of the phenol is eliminated to produce 2,6-dimethyl-p-benzoquinone.

EXAMPLE 4

A charge of 50.0 g. of 2,3,6-trimethylphenol dissolved in 150 ml. of glacial acetic acid is passed through a series of three agitated reactors and thence into a drowning tank of water. Concurrently aqueous 29 percent nitric acid is run into each reactor. The reaction temperature in the first reactor is 28–30° C. and in the second and third reactors is 45–50° C. The feed rate of the 2,3,6-trimethylphenol is 0.89 g. per minute and the hold-up time in the system is about ten minutes. The nitric acid usage as milliliters of 70–71 percent nitric acid per 10 g. of 2,3,6-trimethylphenol is 1.75 in the first reactor, 1.47 in the second reactor, and 1.75 in the third reactor. The trimethyl-p-benzoquinone is isolated by steam distillation and ethyl ether extraction as in Example 2 to give 40.1 g. of trimethyl-p-benzoquinone which assays 96.7 percent. The assay conversion then is 70.0 percent of the theoretical yield.

EXAMPLE 5

A charge of 9.0 g. 2,6-dimethylphenol is dissolved in 180 ml. of glacial acetic acid. With agitation 0.5 g. of sodium nitrite is added. Then a solution of 9.4 ml. conc. nitric acid (70–71%) and 18.8 ml. water (to make 29% nitric acid) is added over 29 minutes at 46–47° C. After stirring 31 minutes at 45–50° C., 150 ml. of water is added and the mixture is steam distilled. The steam distillate is extracted with ethyl ether and the ethyl ether solution is washed with dilute aqueous sodium bicarbonate solution and dried on the steam cone to a temperature of 88° C. to give 1.7 g. of 2,6-dimethyl-p-benzoquinone which assays 89.2%. The assay conversion then is 15.1% of the theoretical yield.

EXAMPLE 6

To a charge of 10.0 g. 2,3,6-trimethylphenol dissolved in 30 ml. of glacial acetic acid and 0.5 g. sodium nitrite are added, with agitation, 16.1 g. of 29.2% nitric acid over 17 minutes at 25–29° C. After stirring 43 minutes at 25–26° C., 100 ml. of water are added, the mixture is steam distilled, and 6.6 g. of 99.2% trimethyl-p-benzoquinone are isolated from the steam distillate by ether extraction for an assay conversion of 59.6% of the theoretical yield. The 2,3,6-trimethylphenol-acetic acid ratio for this example is 1 part to 3.15 parts.

EXAMPLE 7

In a reaction similar to Example 6, at 20° C. and using 10.0 g. 2,3,6-trimethylphenol, 60 ml. of glacial acetic acid and 22.7 g. of 28.6% nitric acid, an assay conversion of 61.5% of the theoretical yield is obtained. The 2,3,6-trimethylphenol acetic acid ratio used is 1 part to 6.3 parts.

EXAMPLE 8

A reaction similar to Example 7 using 30 ml. of glacial acetic acid (the 2,3,6-trimethylphenol-acetic acid ratio being 1 to 3.15) gives an assay conversion of 60.6% of the theoretical yield.

EXAMPLE 9

In a reaction similar to Example 6, at 5° C. and using 20.0 g. 2,3,6-trimethylphenol, 60 ml. of glacial acetic acid (a 1 to 3.15 ratio) and 35.5 g. of 70–71% nitric acid, an assay conversion of 48.6% of the theoretical yield is obtained. The 2,3,6-trimethylphenol-100% nitric acid ratio used is 1 to 1.25.

EXAMPLE 10

In a reaction similar to Example 6, at 25° C. and using 20.0 g. 2,3,6-trimethylphenol, 60 ml. of glacial acetic acid (a 1 to 3.15 ratio) and 45.5 g. of 28.7% nitric acid, an assay conversion of 68.2% of the theoretical yield is obtained. The 2,3,6-trimethylphenol-100% nitric acid ratio used is 1 to 0.65.

EXAMPLE 11

In a reaction similar to Example 6, at 25° C., and using 20.0 g. 2,3,6-trimethylphenol, 60 ml. of glacial acetic acid (a 1 to 3.15 ratio) and 32.9 g. of 28.6% nitric acid, an assay conversion of 69.0% of the theoretical is obtained. The 2,3,6-trimethylphenol-100% nitric acid ratio used is 1 to 0.47.

EXAMPLE 12

In a reaction similar to Example 6, at 20° C. and using 10.0 g. 2,3,6-trimethylphenol, 30 ml. glacial acetic acid (a 1 to 3.15 ratio) and 9.25 g. of 70–71% nitric acid, an assay conversion of 48.6% of the theoretical yield is obtained. The 2,3,6-trimethylphenol-100% nitric acid ratio used is 1 to 0.65.

EXAMPLE 13

In a reaction similar to Example 6, at 5° C. and using 10.0 g. 2,3,6-trimethylphenol, 30 ml. of glacial acetic acid (a 1 to 3.15 ratio) and 15.8 g. of 41.3% nitric acid, an assay conversion of 55.2% of the theoretical yield is obtained. The 2,3,6-trimethylphenol-100% nitric acid ratio used is 1 to 0.65.

EXAMPLE 14

In a reaction similar to Example 6 at 20° C. and using 10.0 g. 2,3,6-trimethylphenol, 30 ml. glacial acetic acid (a 1 to 3.15 ratio) and 36.3 g. of 17.9% nitric acid, an assay conversion of 51.6% of the theoretical yield is obtained. The 2,3,6-trimethylphenol-100% nitric acid ratio used is 1 to 0.65.

EXAMPLE 15

In a reaction similar to Example 6, at 25° C. and using 20.0 g. 2,3,6-trimethylphenol, 60 ml. glacial acetic acid (a 1 to 3.15 ratio) and 67.5 g. of 19.2% nitric acid, an assay conversion of 63.2% of the theoretical yield is obtained. The 2,3,6-trimethylphenol-100% nitric acid ratio used is 1 to 0.65.

EXAMPLE 16

In a reaction similar to Example 6, at 25° C. and using 10.0 g. 2,3,6-trimethylphenol, 30 ml. glacial acetic acid (a 1 to 3.15 ratio) and 24.7 g. of 19% nitric acid, an assay conversion of 69.6% of the theoretical yield is obtained. The 2,3,6-trimethylphenol-100% nitric acid ratio used is 1 to 0.47.

A comparison of the results obtained from several of the examples is as follows:

TABLE I

| Example No. | 2,3,6-tri-methyl-phenol acetic acid ratio | Nitric acid | | Reaction temp., ° C. | Percent assay conversion |
|---|---|---|---|---|---|
| | | Percent concentration used | 2,3,6-tri-methyl-phenol, 100% nitric acid ratio | | |
| 6 | 1/3.15 | 29.2 | 1/0.47 | 25-29 | 59.6 |
| 7 | 1/6.3 | 28.6 | 1/0.65 | 20 | 61.5 |
| 8 | 1/3.15 | 28.6 | 1/0.65 | 20 | 60.6 |
| 10 | 1/3.15 | 28.7 | 1/0.65 | 25 | 68.2 |
| 1 | 1/2.1 | 29.2 | 1/0.47 | 20-25 | 62.3 |

EXAMPLE 17

In a reaction similar to Example 6, at 45–51° C. and using 10.0 g. 2,3,6-trimethylphenol, 30 ml. glacial acetic acid (a 1 to 3.15 ratio) and 22.8 g. of 28.6% nitric acid, an assay conversion of 61.6% of the theoretical yield is obtained. The 2,3,6-trimethylphenol-100% nitric acid ratio used is 1 to 0.65.

EXAMPLE 18

In a reaction similar to Example 6, at 18–20° C. and using 20.0 g. 2,3,6-trimethylphenol, 60 ml. glacial acetic acid (a 1 to 3.15 ratio) and 32.9 g. of 28.6% nitric acid, an assay conversion of 66.9% of the theoretical yield is obtained. The 2,3,6-trimethylphenol-100% nitric acid ratio used is 1 to 0.47.

EXAMPLE 19

In a reaction similar to Example 6, at 35° C. and using 20.0 g. 2,3,6-trimethylphenol, 60 ml. glacial acetic acid (a 1 to 3.15 ratio) and 32.9 g. of 28.6% nitric acid, an assay conversion of 67.8% of the theoretical yield is obtained. The 2,3,6-trimethylphenol-100% nitric acid ratio used is 1 to 0.47.

EXAMPLE 20

In a reaction similar to Example 6, at 75–80° C. and using 10.0 g. 2,3,6-trimethylphenol, 30 ml. glacial acetic acid (a 1 to 3.15 ratio) and 24.7 g. of 19% nitric acid, an assay conversion of 55.2% of the theoretical yield is obtained. The 2,3,6-trimethylphenol-100% nitric acid ratio used is 1 to 0.47.

EXAMPLE 21

In a reaction similar to Example 6 but under 24 inches water pressure, at 25° C. and using 20.0 g. 2,3,6-trimethylphenol, 60 ml. of glacial acetic acid (a 1 to 3.15 ratio) and 32.9 g. of 28.6% nitric acid, an assay conversion of 63.6% of the theoretical yield is obtained. The 2,3,6-trimethylphenol-100% nitric acid ratio used is 1 to 0.47.

EXAMPLE 22

In a reaction similar to Example 6 but at about 700 mm. mercury pressure, at 25° C. and using 20.0 g. 2,3,6-trimethylphenol, 60 ml. of glacial acetic acid (a 1 to 3.15 ratio) and 32.9 g. of 28.6% nitric acid, an assay conversion of 65.2% of the theoretical yield is obtained.

The 2,3,6-trimethylphenol-100% nitric acid ratio used is 1 to 0.47.

EXAMPLE 23

To a charge of 15.0 g. 2,3,6-trimethylphenol dissolved in 45.0 ml. of glacial acetic acid, 12.8 g. of 44.2% sulfuric acid and 0.5 g. of sodium nitrite are added, with agitation, a solution of 9.0 g. ammonium nitrate in 10.2 ml. of water over 32 minutes at 20° C. After stirring 30 minutes at 20–22° C., 100 ml. of water are added, the mixture is steam distilled, and 10.5 g. of 98.3% trimethyl-p-benzoquinone are isolated from the steam distillate by ether extraction for an assay conversion of 62.5% of the theoretical yield.

In the above examples sufficient nitric acid is added to the solvent mixture to obtain substantially complete oxidation of the phenol. The ratio of phenol to nitric acid in parts by weight may vary from about 1:0.1 to about 1:3 with particularly superior results being obtained when the part by weight ratio is about 1:0.5 to about 1:1.5. In addition, the ratio of phenol to glacial acetic acid solvent in parts by weight may vary from about 1:0.5 to about 1:10, with particularly superior results being obtained when the part by weight ratio is about 1:1.5 to about 1:3.

The invention has been described in detail with particular reference to preferred embodiments thereof, but it will be understood that variations and modifications can be effected within the spirit and scope of the invention as described hereinabove and as defined in the appended claims.

TABLE II

| Example No. | 2,3,6-tri-methyl-phenol acetic acid ratio | Nitric acid | | Reaction temp., ° C. | Percent assay conversion |
|---|---|---|---|---|---|
| | | Percent concentration used | 2,3,6-tri-methyl-phenol, 100% nitric acid ratio | | |
| 8 | 1/3.15 | 28.6 | 1/0.65 | 20 | 60.6 |
| 9 | 1/3.15 | 70-71 | 1/1.25 | 5 | 48.6 |
| 12 | 1/3.15 | 70-71 | 1/0.65 | 20 | 48.6 |
| 11 | 1/3.15 | 28.6 | 1/0.47 | 25 | 69.0 |
| 16 | 1/3.15 | 19.0 | 1/0.47 | 25 | 69.6 |

I claim:
1. Process for preparing a polyalkyl-p-benzoquinone having the formula

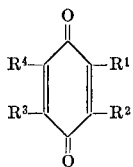

which comprises contacting a polyalkyl phenol having the formula

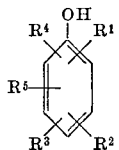

with nitric acid in the presence of acetic acid at a temperature of about 5° C. to about 80° C., the weight ratio of the phenol to nitric acid being from about 1:0.1 to about 1:3 and the weight ratio of the phenol to acetic acid, calculated as glacial acetic acid, being from about 1:0.5 to about 1:10, wherein $R^1$, $R^2$, $R^3$, $R^4$ and $R^5$ are the same or different and each is hydrogen or alkyl of up to 8 carbon atoms, at least 2 of the R groups being alkyl.

2. Process according to claim 1 wherein the weight ratios of the phenol to nitric acid and phenol to acetic acid are from about 1:0.5 to about 1:1.5 and from about 1:1.5 to about 1:3, respectively.

3. Process according to claim 2 in which the polyalkyl-p-benzoquinone is 2,6-dialkyl-p-benzoquinone or 2,3,6-trialkyl-p-benzoquinone and the polyalkyl phenol is 2,6-dialkylphenol, 2,3,6-trialkylphenol or 2,4,6-trialkylphenol and wherein the process is conducted at a temperature of about 20° C. to about 30° C.

4. Process according to claim 2 in which the polyalkyl-p-benzoquinone is trimethyl-p-benzoquinone and the polyalkyl phenol is tirmethylphenol.

5. A process according to claim 2 in which the polyalkyl-p-benzoquinone is 2,3,6-trimethyl-p-benzoquinone and the polyalkyl phenol is 2,3,6-trimethylphenol and wherein the process is conducted at a temperature of about 20° C. to about 30° C.

References Cited

UNITED STATES PATENTS 2,687,939   8/1954   Sartori _____ 260—396

LORRAINE A. WEINBERGER, Primary Examiner

L. A. THAXTON, Assistant Examiner